United States Patent [19]

Bays

[11] Patent Number: 4,744,439
[45] Date of Patent: May 17, 1988

[54] TARGET PLATE FOR IMPULSE-TYPE ACOUSTIC SIGNAL GENERATOR

[75] Inventor: Marvin G. Bays, Ponca City, Okla.

[73] Assignee: Atlantic Richfield Company, Los Angeles, Calif.

[21] Appl. No.: 650,317

[22] Filed: Sep. 12, 1984

Related U.S. Application Data

[63] Continuation of Ser. No. 311,100, Oct. 13, 1981.

[51] Int. Cl.⁴ .............................................. G01V 1/04
[52] U.S. Cl. .................................... 181/114; 181/401
[58] Field of Search ............... 181/113, 114, 121, 400, 181/401; 73/790, 801, 818; 173/22, 90, 128; 484/173; 248/20

[56] References Cited

U.S. PATENT DOCUMENTS

| | | | |
|---|---|---|---|
| Re. 27,418 | 7/1972 | Mayne | 181/121 |
| 3,416,363 | 12/1968 | Siems | 73/790 |
| 3,817,091 | 6/1974 | Frederick | 73/84 |
| 4,608,675 | 8/1986 | Chelminshi | 181/114 |

Primary Examiner—Nelson Moskowitz
Attorney, Agent, or Firm—Robert M. Betz

[57] ABSTRACT

A rigid, earth-contacting target for use with an acoustic signal generator is designed to be impacted by a mass propelled downwardly by compressed air or other energy source. The target includes an upper impact-receiving member slidably interfitted with a lower ground-contacting member. An elastomeric disc is confined between the upper and lower members so as to experience three-dimensional compression in response to such impact. The bulk modulus of the elastomer determines the degree to which the rate of acceleration of the lower member is reduced as compared to that of the upper member, and thus in turn, controls the frequency content of the resultant acoustic pulse.

3 Claims, 2 Drawing Sheets ical signal generator with improved means for controlling the frequency characteristics of the injected acoustic signal without sacrificing energy efficiency.

TARGET PLATE FOR IMPULSE-TYPE ACOUSTIC SIGNAL GENERATOR

This is a continuation of application Ser. No. 311,100, filed Oct. 13, 1981.

BACKGROUND OF THE INVENTION

1. Field of the Invention

This invention relates generally to the field of acoustic signal generators of the type wherein an impact mass is propelled forceably downward against a rigid target in contact with the earth. More particularly, the invention is concerned with the construction of such targets.

2. Description of the Prior Art

Prior art seismic impulse generators of the character referenced above are typically provided with means for propelling an impact mass into contact with a rigid earth-contacting target in axial alignment with the moving mass. The attained kinetic energy of the impact mass is transferred instantaneously into the target. Generally speaking, the target is given a relatively wide bottom area in contact with the earth so as to distribute the force of the impact over a fairly wide area. This helps to insure that the underlying earth is subjected to an elastic rather than a plastic deformation so that the available energy is utilized with maximum efficiency in creating an acoustic pulse to be injected into the earth. For rapid acceleration, the target element is preferably light in weight and, of course, is sufficiently rigid to avoid bending or bowing in the middle. Generally speaking, the target has has a flat bottom plate and is provided with an upstanding pillar or hub portion adapted to receive a blow from the impact mass. The target may either be a separate element or may be interfitted within the structure which guides the path of the impact mass. The latter arrangement is useful, not only for purposes of alignment but also makes it relatively easy to pick up the target in moving from one site to another.

In devices of this character, a high speed impact mass accelerates the target downwardly at a corresponding high rate. This rate determines the frequency spectrum of the resultant acoustic signal injected into the earth. If one wishes to change the character of the injected signal such as by eliminating the highest frequency components, the prior art teaches that this is accomplished by reducing in some manner the velocity of the impact mass or increasing the weight of the target.

It is, therefore, a general object of this invention to provide a target for an impulsive-type acoustic signal generator with improved means for controlling the frequency characteristics of the injected acoustic signal without sacrificing energy efficiency.

A further disadvantage which has been noted in the operation of an impulsive-type acoustic signal generator employing such a target plate is that the acceleration forces are so great upon impact that the entire target, after repeated blows, simply fractures or fails. This failure is not only due to the high G-forces generated internally, but also the fact that uneven stress distribution is created from the center to the periphery of the target plate. With an initial impact force distributed over a small cross-sectional area, a very high bending moment occurs in the center of the plate which seeks to place its bottom surface in tension and the top surface in compression. This bending moment or stress concentration becomes progressively less toward the periphery of the plate.

It is, therefore, another object of this invention to provide a target plate for an acoustic generator wherein the internal stresses are distributed more evenly.

It is a further object of this invention to provide a target for an acoustic signal generator wherein destructive high G-forces are neutralized without interfering with the acoustic efficiency of the target.

Other and further objects of this invention will become apparent from a consideration of the detailed description of the preferred embodiments to follow, taken in conjunction with the drawings and the appended claims.

SUMMARY OF THE INVENTION

A target plate for an impulse type acoustic generator comprises a ground-contacting bottom plate with a centrally positioned hub extending upward from its top surface. An upwardly opening bore within the hub is adapted to slidably receive a striker plate, which in turn absorbs the entire input energy from the falling mass. An elastomeric disc or other element or material of selected bulk modulus and shear stiffness is adapted to be confined within the bore of the hub beneath the striker plate so that the entire downward force on the striker plate is utilized in three-dimensional compression of such disc. Because of its low shear stiffness, the disc distributes this compressive force uniformly over its entire cross-sectional area. The disc may be selected of material adapted to absorb or reflect the highest frequency shock waves transmitted through the striker plate, thus minimizing high G-force fractures. The initial high rate of acceleration of the striker plate places the disc in confined three-dimensional compression, which, in turn, produces acceleration of the entire bottom plate at a reduced rate, thus generating the acoustic pulse of interest. The lower the bulk modulus of the elastomeric disc, the more the high frequency components of the acoustic signal are attenuated. Stiffener ribs are provided which radiate outwardly of the hub toward the perimeter of the bottom plate, such ribs being tapered downwardly from the hub toward the plate perimeter.

DETAILED DESCRIPTION OF THE PREFERRED EMBODIMENTS

Figure 1:
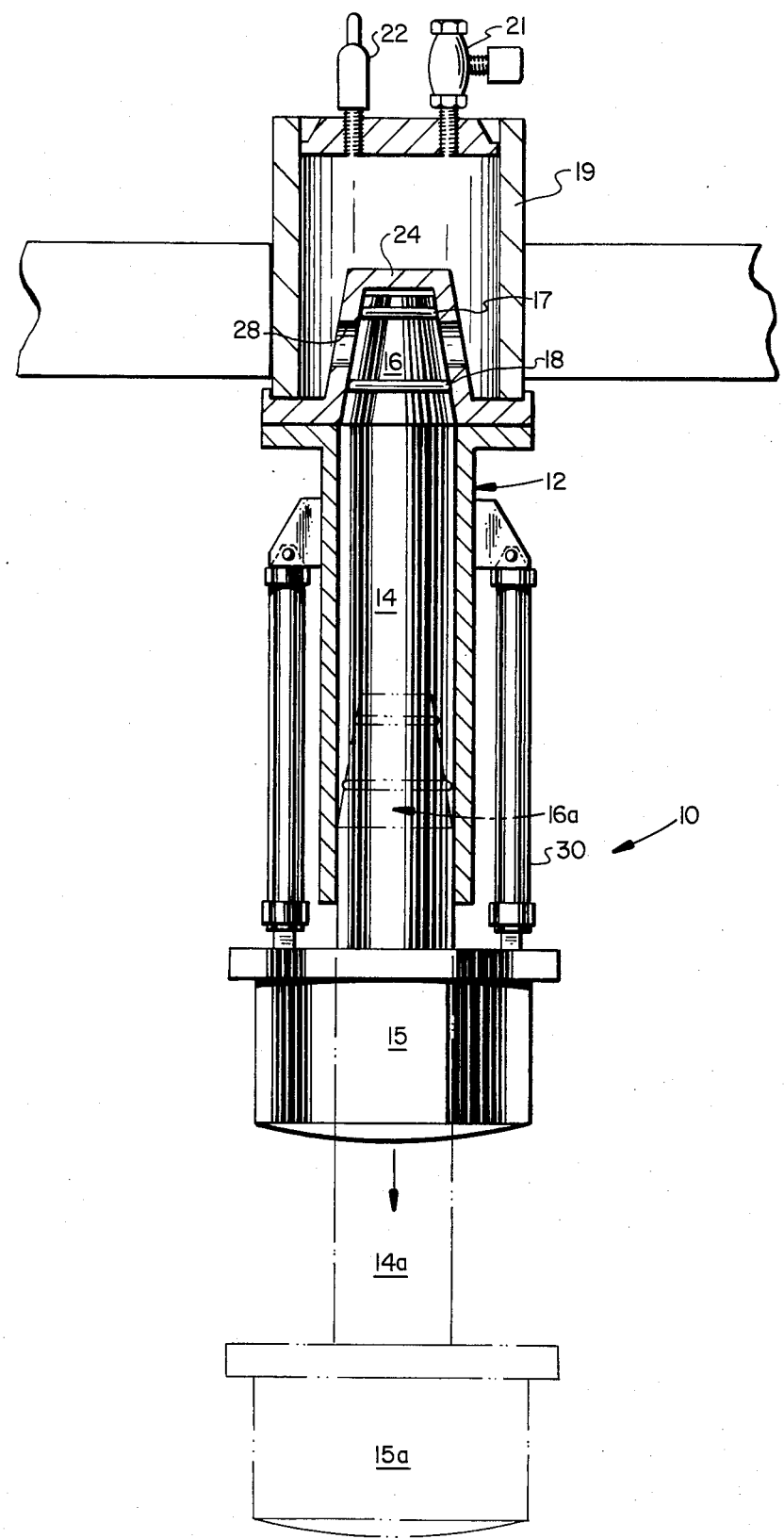
FIG. 1 illustrates, partly in section and partly in elevation, a view of an impact mass type acoustic generator suitable for use with the device of this invention.

Referring now to FIG. 1, there is illustrated an impulse-type acoustic signal generator 10 with which the target plate of this invention is adapted to be used. Generator 10 includes an upstanding, open-ended housing or guide means 12 within which a piston rod 14 is slidably mounted. An enlarged impact mass 15 is attached to the bottom end of rod 14. The top end of rod 14 is tapered to form a male valve portion 16 provided with spaced-apart upper and lower seals 17 and 18. As shown, the mass 15 is illustrated in a firing position at the top of its travel relative to housing 12. Upon firing, the mass 15 is driven downwardly to the position shown in dotted outline and identified by the numeral 15a. Energy for propelling mass 15 is provided by compressed air within container 19 operatively interconnected with the upper end of housing 12. At the top of container 19, there are provided a fill valve 21 and a safety relief valve 22. A tapered female valve 24 extends upwardly from housing 12 within the container 19, valve 24 being provided with a plurality of ports 28 by means of which the tapered surface of mass 15 is in constant contact with compressed air.

By means unnecessary to detail here, the mass 15 is initially latched from beneath in its upper firing position, such latch means being withdrawn such as by electrical signal when a firing operation is to take place. As soon as the upper seal 17 separates from the tapered inner bore of valve 24, compressed air from container 19 is provided with a path to the top surface of valve 6 thus propelling it powerfully downward to the dotted bottom position 16a as shown in FIG. 1. Retraction of mass 15 to its initial firing position may be accomplished by means of hydraulic cylinders 30.

Figure 2:
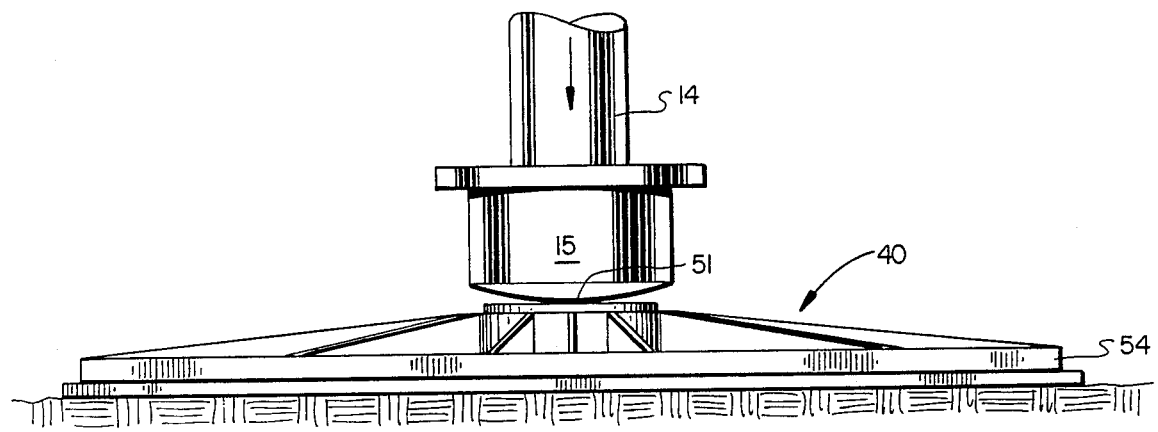
FIG. 2 illustrates in elevation a target plate in accordance with this invention.
Figure 3:
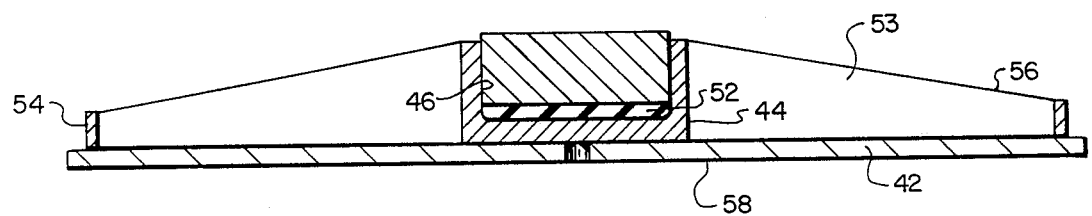
FIG. 3 illustrates in vertical section a target plate in accordance with the preferred embodiment of this invention.
Figure 4:
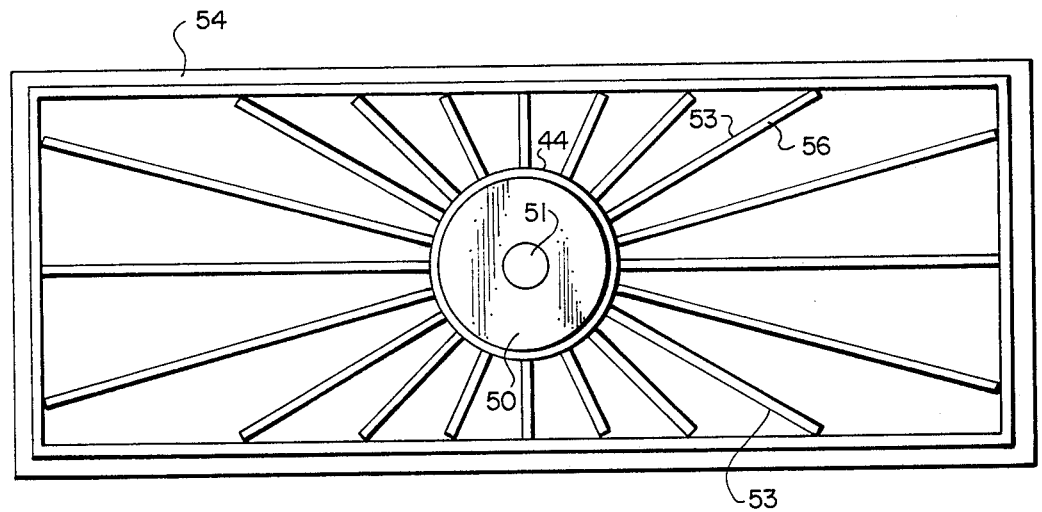
FIG. 4 illustrates in plan a target plate in accordance with the preferred embodiment of this invention.

FIG. 2 shows the bottom mass 15 of the generator 10 at the moment of contact with a target 40 which may be situated in contact with the earth, beneath and in axial alignment with housing 12. As best seen in FIG. 3, target 40 includes a flat bottom plate 42 of relatively wide cross-sectional area which may be rectangular, square, circular, or other desired configuration. A cylindrical hub 44 is conveniently welded to the upper surface of bottom plate 42 and centrally located with respect thereto. Hub 44 is provided with a counter bore 46 opening upwardly, its bottom end being preferably solid. A light weight striker plate 50 is adapted to be slidably received within bore 46 of hub 44. Confined beneath striker plate 50 is an elastomeric disc 52 of equal diameter which rests against hub 44, its thickness being such that striker plate 50 protrudes slightly above the surrounding material of hub 44 to insure that it absorbs the full kinetic energy of the impact mass 15. The elastomer disc 52 is not attached to the under surface of striker plate 50 so that its "confined spring" behavior is not interfered with. The bottom plate 42 is centrally bored completely through to expose the under surface of the hub 44. The hub 44 is then welded to the bottom plate 42 at the base of this hole 50, the purpose being to eliminate ringing or high frequency oscillations. Extending radially outward from the external surface of hub 44 are a plurality of stiffener ribs 53 which terminate at perimeter shoulder 54. It will be noted that stiffener ribs 53 taper downwardly from hub 44 to shoulder 54.

In a practical device, the bottom plate 42 is about 1" in thickness, the hub 44 about 6" in height, the elastomer disc 52 about 1" in thickness, and the striker plate 50 about 4" high so that it projects about ¼" above the top surface of the hub 44. The bottom surface of the mass 15 is preferably softer than the material of the striker plate 50 so that there is no point or line contact. Ideally, a contact area 51 at impact having a minimum cross-sectional area of a 1" radius circle is desirable.

A first purpose of the elastomer disc is to control the rate of acceleration of bottom plate 42 and, therefore, the frequency content of the acoustic pulse to be injected into the earth. As the bulk modulus of the material of disc 52 increases, its confined spring stiffness also increases, as does the resultant acceleration rate of bottom plate 42 for a given initial acceleration rate of striker plate 50. As used herein, the term "bulk modulus" is defined to mean the increase in pressure corresponding to a fractional decrease in volume. Expressed mathematically, bulk modulus, $$B = \frac{-P}{\Delta V/V_o},$$

where P=unit pressure (lb/in$^2$), $\Delta V$=differential volume, $V_o$=initial volume. Thus, for example, to eliminate only the higher frequency components, of the acoustic signal, one chooses a disc material of relatively high bulk modulus. The operation of this device can be viewed as a two-stage acceleration. The first stage is the rapid downward acceleration of the striker plate 50. This subjects the disc 52 to "confined spring" compression. In reaction to this compression force, disc 52, in turn, induces the second acceleration of bottom plate 42 at a lower rate.

The elastomer disc 52 is selected with a bulk modulus which produces the desired "confined spring" stiffness for disc 52. It has been found that natural rubber is a better choice for disc 52 than synthetics such as neoprene, in that it has less hysteresis, i.e., less absorbed energy is converted to heat. A rubber material found to work well possesses a Shore A Scale 40 Durometer hardness. It is essential in achieving "confined spring" action that the entire surface of disc 52 be in contiguous contact with the surrounding walls and surfaces, which is why it must be situated beneath striker plate 50. If disc 52 were positioned on top of striker plate 50, it would obviously be subject to mechanical damage, but in addition to that, its unconfined spring rate would be ineffective for the purposes of this invention.

A second purpose of disc 52 is to insure that the initial force on striker plate 50 is distributed over a wider cross-sectional area. Because an elastomer has low shear stiffness, even an off center blow on striker plate 50 will be translated into an evenly distributed downward force on bottom plate 42. Note further that because striker plate 50 is constrained to move within bore 46, even an axially misaligned blow by mass 15 will be converted into a force normal to the surface of disc 52.

Disc 52 also acts as a reflector or absorber of the high frequency acoustic shock waves passing through striker plate 50 and thus minimizes the damaging effect of the internal reverberations of such shock waves.

Within the scope of this invention, one may substitute a liquid material of appropriate characteristics for elastomer disc 52, provided the necessary seals are positioned so as to insure its confinement beneath striker plate 50.

In order to better distribute the stresses from hub 44 to the perimeter of plate 42, stiffener ribs 52 have been tapered radially outward. This equalizes stress, thus lessening the possibility of stress buildup and breakage or fracturing. What is important to appreciate is that with downward force on target plate 40, the top surface 56 of radial stiffener ribs 53 tends to be in compression and the bottom surface 58 of bottom plate 42 tends to be in tension, thus creating a series of bending moments which are greatest at the center of the target 40. The tapered stiffener ribs 53 have the effect of equalizing the stress across the entire cross-sectional area of the target 40.

It should be understood that the advantages of the above-described construction for target plate 40 are applicable to any context in which acoustic energy is to be transmitted into a medium with which the bottom plate 42 is in contact. In other words, any means for delivering kinetic energy in the form of a blow to the striker plate 50 may find application with a target plate constructed in accordance with this invention. Furthermore, there is no intention to confine the usage of target plate 40 to a horizontal configuration or in the generation of compressional acoustic waves. Placing target plate 40 on a slant with respect to the horizon and applying a slanting blow to striker plate 50 may, for example, be useful in the generation of combined compressional and shear waves.

What has been described above should be understood as illustrative only of this invention. Clearly, those skilled in this art may choose a variety of different dimensions and configurations of the component portions of the target plate as well as material constituents without departing the scope of this invention as more particularly set forth in the claims to follow.

What is claimed is:

1. An acoustic signal generator comprising:
   (a) an earth-contacting target plate having a relatively large bottom area in contact with the earth which area is sufficient to produce principally elastic deformation of the earth when said target plate receives an impact from a mass;
   (b) an impact mass supported above said target plate;
   (c) means for propelling said impact mass downwardly toward said target plate;
   (d) an elastomeric disk of selected bulk modulus positioned upon an upwardly facing surface of said target plate;
   (e) a striker plate supported upon said disc for receiving a blow from said impact mass and transmitting the energy thereof to said target plate through said disc; and
   (f) means for confining said disc so that it experiences three-dimensional compression responsive to downward movement of said striker plate, thereby effecting a reduction in the rate of acceleration of said target plate responsive to said blow which is inversely proportional to the value of said bulk modulus.

2. An acoustic signal generator comprising:
   (a) an earth-contacting target;
   (b) an impact mass, supported above said target plate;
   (c) means for propelling said mass downwardly toward said target plate;
   (d) a hollow hub fixed to and extending upwardly from said target plate, said hub being provided with an upwardly opening cylindrical bore aligned with the path of said descending impact mass;
   (e) an elastomeric disc of selected bulk modulus seated within said bore and having equal diameter therewith; and
   (f) a cylindrical striker plate projecting slidably within said bore so as to rest upon said disc, said plate being adapted to receive said blow from said impact mass and transmit the energy thereof through said disc to said target plate, the resultant rate of acceleration of said target plate responsive to said blow being thereby reduced in inverse proportion to the value of said bulk modulus.

3. Apparatus as in claim 2 wherein said striker plate extends above said hub.

* * * * *